United States Patent Office 3,346,539
Patented Oct. 10, 1967

3,346,539
TRIOXANE-GLYCIDALDEHYDE
COPOLYMERIZATION
Irving Rosen, Painesville, Ohio, assignor to Diamond Alkali Company, Cleveland, Ohio, a corporation of Delaware
No Drawing. Filed Mar. 26, 1964, Ser. No. 355,100
6 Claims. (Cl. 260—67)

This invention relates to novel thermoplastic compositions of matter. More particularly, it relates to oxymethylene copolymer compositions of high thermal stability.

It is now well known how to prepare oxymethylene homopolymers by polymerizing either formaldehyde, trioxane or other formaldehyde oligomers in the presence of certain polymerization catalysts, preferably under substantially anhydrous conditions. These polymers, which ore thermoplastic materials composed of repeating oxymethylene —CH$_2$O— units joined together in linear chains terminated at one or both ends by thermally unstable hydroxyl groups, may vary widely in thermal stability depending upon the method of preparation. Polyoxymethylenes of high average polymer molecular weight are known to be more stable against thermal degradation than those of lower molecular weight. However, even high molecular weight oxymethylene polymers will be degraded or decomposed in varying degrees when exposed to elevated processing temperatures. To minimize degradation, therefore, these materials prior to being processed are usually further treated such as by chain end-group "capping," i.e., by converting the unstable hydroxyl groups to more stable ester or ether groups, and/or by incorporating therewith stabilizing additives which may also inhibit polymer degradation to a substantial degree.

It is an object of this invention, therefore, to provide a polymeric composition structurally related to polyoxymethylene and possessing the same toughness and strength properties, but which exhibits an improved resistance to thermal degradation.

It is another object of this invention to provide a composition having a high degree of thermal stability which suitably may be employed to prepare tough and durable plastic articles such as films, moldings, extrusions and the like.

It is still another object of this invention to provide tough and durable plastic articles such as the above-described from an oxymethylene copolymer composition having a high degree of thermal stability.

These and other objects of this invention are accomplished by copolymerizing, under substantially anhydrous conditions and in the presence of a suitable polymerization catalyst or initiator, trioxane and glycidaldehyde which has the structure

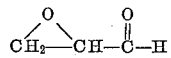

More specifically, the present invention involves the preparation of useful, easily workable oxymethylene copolymer compositions by polymerizing under conditions as stated above, a monomeric mixture containing from 90 up to 99.9 mol percent of trioxane in combination with from 0.1 up to 10 mol percent of glycidaldehyde, the said process being conducted at a temperature within the range of 40° to 80° C.

The copolymer products obtained are solid, medium to high molecular weight materials exhibiting inherently a high degree of thermal stability, being not subject to substantial weight reduction, i.e., decomposition or degradation when exposed to temperatures of at least 200° C. or above, contrary to the significant or complete decomposition evidenced by unstabilized oxymethylene homopolymers similarly prepared and processed. Therefore, these copolymers may be fabricated at the required elevated temperatures without first being stabilized as by "capping" of unstable end-groups. Additionally, they also may be processed without the use of stabilizing additives therewith.

The thermal stability of the copolymers as observed during processing operations and which will be described hereinafter by specific examples is determined by thermogravimetric analysis, i.e., by measuring the constant rate at which they degrade at an elevated temperature at which degradation can be easily and accurately measured. This method, as generally practiced, is well known in the art and, as employed herein, involves heating in an inert atmosphere a prescribed quantity of the copolymer in an oven maintained at 245° C., measuring and recording the weight loss or the degradation of the copolymer at intervals during the heat exposure period and then plotting the logarithm of the weight percent of the remaining undegraded copolymer versus the corresponding times of oven exposure. A decomposition curve drawn through the plotted values indicates that the copolymer degrades initially at a very fast rate, after which it degrades at a much slower, more even rate throughout the major portion of the degradation period. This latter period characterizes the stable nature of the copolymer. Accordingly, the reaction rate constant for thermal degradation of the copolymers of this invention is selected from that portion of the degradation curve which represents the weight loss of the copolymer after the initial decomposition is completed, i.e., from the latter portion of the degradation curve. The copolymers of this invention exhibit generally a reaction rate constant for thermal degradation at 245° C. of 0.6 weight percent per minute or less, with the preferred copolymers exhibiting a reaction rate constant of 0.5 weight percent per minute or less.

While I do not wish to be bound by any definite theory with regard to the manner in which copolymerization is accomplished, it is believed that the glycidaldehyde may be incorporated into the growing copolymer chain primarily through the epoxide group by an opening of the epoxide ring. Thus, the growing polymer chain may contain, interpersed with recurring oxymethylene groups, units derived from glycidaldehyde having the structure:

(I)
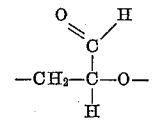

It is to be noted that from a qualitative infrared analysis of the copolymer product, it appears that copolymerization is effected substantially in this manner.

During the reaction, however, it is believed that addition may also proceed through the carbonyl bond (C=O) in at least a portion of the incorporated glycidaldehyde units structurally represented above, such doubly added units thus serving as cross-linking agents by being interspersed between recurring oxymethylene units of adjacent copolymer chains as represented by the following structure:

(II)
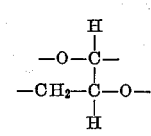

As the copolymer products exhibit, in many instances, only partial solubility in many organic liquids which normally dissolve completely linear oxymethylene copolymers, it appears that the further addition of glycidaldehyde monomer through its second double bond (as represented by Structure II above), most likely occurs to some extent in the process.

It is also possible that in the reaction, the glycidaldehyde monomer may be incorporated into the copolymer chain by addition through the carbonyl bond rather than through the epoxide ring, so that the resulting copolymer chain contains recurring glycidaldehyde units having the following representative structure:

(III) 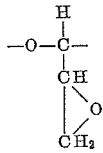

In the copolymer chain, the units derived from glycidaldehyde as previously described may be interspersed singly between recurring oxymethylene units and may likewise be present therein as comonomer blocks, i.e., segments of the chain comprising at least two of any one or of all of the units (as represented by Structures I, II and III above) sequentially joined together with no oxymethylene unit between them.

Depending upon the percentage of glycidaldehyde monomer present in the copolymer products of this invention, these materials have melting points somewhat lower than or approximately the same as oxymethylene homopolymers, i.e., these copolymers have melting points within the range of about 160° to 185° C. whereas similarly prepared homopolymers have melting points of 175° to 186° C. In appearance, the copolymers resemble polyoxymethylene and those having similar melting points likewise exhibit substantially similar physical properties.

The copolymer products may contain generally from about 0.1 up to 10 mol percent of glycidaldehyde monomer units. Thus in the copolymer chain, there may be from about 90 up to 99.9 percent of oxymethylene recurring units and from about 0.1 up to 10 percent of recurring units derived from glycidaldehyde. The preferred copolymers contain from about 0.1 up to 5 percent of the said recurring units derived from glycidaldehyde and from about 95 up to 99.9 percent of recurring oxymethylene units.

The copolymerization reaction is effected in the presence of an ionic-type polymerization catalyst. Suitable compounds of this type include Lewis acids, e.g., metal halides such as the halides of aluminum, boron, tin, titanium, zirconium, strontium, niobium and the like and coordinate complexes of such metal halides with organic compounds in which oxygen, nitrogen or sulfur is the donor atom. In practice, the coordinate complexes of metal halides with organic compounds are most suitably employed with the coordinate complexes of boron trifluoride being especially preferred. Suitable boron trifluoride complexes may be, for example, a complex of boron trifluoride with an alcohol, a phenol, an acid, an ether, an acid anhydride, an ester, a ketone, an aldehyde, a dialkyl sulfide, a mercaptan and the like. Of these types, the boron trifluoride complexes with ethers such as diethyl ether, dibutyl ether, etc. are especially preferred. Fluoroborate aryl diazonium salts such as phenyl diazonium fluoroborate are also preferred for use. In general, the particular catalyst employed in the process of this invention may be used in amounts ranging from $5 \times 10^{-6}$ to $6 \times 10^{-4}$ mols per mol of trioxane, i.e., from about 0.005 to about 0.6 millimol for each mol of trioxane employed. However, an amount of catalyst within the range of about 0.01 to about 0.3 millimol per mol of trioxane is generally satisfactory and is preferred.

The copolymer products of this invention may be conveniently prepared in good yields by incorporating the trioxane and glycidaldehyde monomer with a catalyst in the absence of a solvent or other liquid reaction medium. Alternatively, the polymerization may be conducted in an anhydrous organic liquid which is a solvent for the trioxane and the glycidaldehyde. Solvents preferably employed are aliphatic hydrocarbons, e.g., hexane, cyclohexane, heptane and the like. In most instances, the polymer product formed is essentially insoluble in the solvent used in the reaction and may be recovered easily therefrom by filtration. Typically, the ratio of 0.2 to 5 parts solvent for each part of trioxane is employed in the reaction.

As stated previously, the reaction, whether conducted in bulk or in the solvent medium as described above, generally may be carried out at temperatures within the range of 40° to 80° C. for a time period of from 1 hour to 30 hours. However, reaction temperatures ranging from 50° to 60° C. and reaction times of 4 to 8 hours are preferably employed.

As it has been found that trace contaminants such as water in the reaction mixture inhibit monomer conversion to the desired copolymers in good practical yields, it is essential that the copolymerization process be conducted under anhydrous or substantially anhydrous conditions. It has been established that the reaction ingredients, i.e., the monomers or the monomers and solvent in combination, should contain no more than 100 p.p.m., preferably no more than 50 p.p.m. of water. Likewise, impurities in the monomers should be removed as completely as possible. In practice, the catalyst employed is prepared and then kept prior to use in a nitrogen atmosphere. The monomeric materials are advantageously dried prior to copolymerization by careful distillation over a dehydrating agent such as sodium or phosphorus pentoxide and by passage of the monomer vapors formed through an absorbent such as molecular sieves, etc. When employed, the liquid reaction medium may be dehydrated by standard distillation and drying methods.

Upon completion of the reaction and prior to drying of the copolymer product, it is usually purified by masticating it well under methanol. Additionally, the copolymer may also be heated briefly at a temperature of 100° to 150° C. to decompose any loose, unstable chain ends.

As shown hereinafter by specific examples, the copolymers of this invention possess inherently a high degree of thermal stability and may be processed, as prepared, without any further stabilizing treatments such as by chain end-group "capping" and/or by incorporating stabilizing additives therewith. However, it is to be understood that the copolymers may be so stabilized, if desired, without departing from the intended scope of this invention.

The copolymer products may be used to prepare articles such as moldings, films, sheets, rods, tubes, fibers, filaments and the like by conventional molding, casting and/or extrusion processes such as are presently practiced. The finished articles exhibit generally the excellent physical and chemical properties which are typical of articles fabricated from oxymethylene homopolymers. In processing, the copolymer products may be used unmodified or, if desired, may have incorporated therewith additives such as antioxidants, fillers, pigments, stabilizers, processing aids and the like which are oftentimes employed when processing thermoplastic materials.

In order that those skilled in the art may more completely understand the present invention and the preferred methods by which the same may be carried into effect, the following specific examples are offered.

*Example 1*

A 250-ml. resin flask equipped with a thermometer, an agitator, a nitrogen inlet tube and an opening for a rubber serum cap is heated to 70° C. in a water bath and is purged with nitrogen. Two-hundred g. (2.22 mols) of molten trioxane is added to the flask and agitation is started. After installing a rubber serum cap in the flask opening and reducing the nitrogen flow to maintain only a slight positive nitrogen pressure on the reaction mixture, 9.6 ml. (11.0 g., 0.153 mol) of glycidaldehyde (2.3 mol percent, based on the formaldehyde equivalent of the trioxane) is charged into the flask and blended with the trioxane. 0.013 g. (0.03 millimol per mol of trioxane)

of boron trifluoride dibutyl etherate in solution in cyclohexane is then injected into the reaction mixture, after which the reaction mixture is maintained at 70° C. under a slight positive nitrogen pressure for 5 hours. The mixture is then discharged from the flask and the polymeric solids ground in a Waring blender containing methanol. The pulverulent product obtained is then leached well with methanol and finally dried at 50° C. under vacuum. There is recovered 182.4 g. (91 percent of theoretical yield) of a fine, white polymeric material which contains about 2 mol percent of glycidaldehyde units. This copolymer has a melting point of about 166° C. and, with continued heating, shows substantial stability up to at least 250° C. It has a reaction rate constant for thermal degradation at 245° C. of 0.28 weight percent per minute, 96 percent of the copolymer remaining stable after the initial decomposition is completed. Portions of the copolymer are molded for 1 minute at 180° C. under a pressure of 4000 p.s.i. to prepare tough, opaque specimen moldings which do not exhibit any thermal degradation.

Example 2

A 50-ml. resin flask equipped as described in Example 1 is heated to 58° C. in a water bath and purged with nitrogen. Ten ml. of anhydrous cyclohexane and 35.1 g. (0.39 mol) of molten trioxane are charged to the flask and mixed well with agitation. The serum cap is then fitted onto the flask and the nitrogen flow reduced as outlined in Example 1, after which 1.44 ml. (1.64 g., 0.023 mol) of glycidaldehyde is injected into the flask, followed by 0.008 g. (0.04 millimol) of boron trifluoride dibutyl etherate catalyst. With continuous agitation, the reaction mixture is maintained at 58° C. and under a slight positive nitrogen pressure for 6 hours. The reaction mixture is then cooled and discharged from the flask. The solid product is separated from the liquid medium and ground in a Waring blender containing methanol. The pulverulent solids obtained are then purified and dried as described in Example 1. The finished product recovered, which is obtained in 78 percent yield (27.3 g.) contains about 1.5 mol percent of glycidaldehyde units. This copolymer product has a melting point of about 168° C. and a reaction rate constant for thermal degradation at 245° C. of 0.25 weight percent per minute, 90 percent of the copolymer remaining stable after the initial decomposition is completed. When the copolymer is molded under conditions as described in Example 1, rigid specimen moldings are obtained which are similar in appearance to the molded products of Example 1.

Example 3

A copolymer is prepared following the general procedure and using the same proportion of ingredients as outlined in Example 2, with the exception that, in this example, 0.72 ml. (0.82 g., 0.0014 mol or 3 mol percent based on trioxane) of glycidaldehyde is employed. There is recovered 23.7 g. (68 percent of theoretical yield) of a white, polymeric material which contains about 1 mol percent of glycidaldehyde units. This product, which melts at approximately 170° C., has a reaction rate constant for thermal degradation at 245° C. of 0.43 weight percent per minute, about 85 percent of the copolymer remaining stable after the initial decomposition is completed. This copolymer is molded under conditions as previously described to prepare rigid, tough moldings which exhibit no thermal degradation.

Example 4

Following the general procedure and using the same proportion of ingredients as outlined in Example 2, a trioxane-glycidaldehyde copolymer is prepared at 58° C. In this example, 0.0026 g. (0.013 millimol) boron trifluoride dibutyl etherate in solution in cyclohexane is employed. The reaction is conducted for 6 hours. The product has a melting point of approximately 168° C., and a reaction rate constant for thermal degradation at 245° C. of 0.33 weight percent per minute, 95 percent of the copolymer remaining stable after the initial decomposition is completed. Tough, rigid moldings can be prepared from this copolymer as described in the previous examples.

Example 5

A copolymer is prepared as described in Example 2, employing 22.2 g. of trioxane (0.247 mol), 20 ml. of anhydrous cyclohexane, 0.96 ml. (1.1 g., 0.015 mol) of glycidaldehyde (6 mol percent based on trioxane) and 0.012 g. of boron trifluoride dibutyl etherate in solution in cyclohexane (0.26 millimol per mol trioxane). After the catalyst addition, the reaction is conducted for 8 hours, the temperature of the reaction mixture being maintained at 65° C. The polymeric product recovered contains about 2 mol percent of glycidaldehyde units, and melts at about 163° C. When tested for thermal stability at 245° C., as described previously herein, this copolymer product degrades about 0.33 weight percent per minute for the first 6 minutes of the test (initial decomposition). For the remaining major portion of the test, the copolymer sample degrades, i.e., has a reaction rate constant for thermal degradation of 0.17 weight percent per minute.

Example 6

To illustrate the vastly improved thermal stability characteristics of the copolymers of this invention by comparison to similarly prepared, unstabilized oxymethylene homopolymers, a homopolymer is prepared following the general procedure outlined in Example 2 and employing 35.2 g. (0.391 mol) of trioxane, 32 ml. of cyclohexane and 0.01 g. (0.05 millimol) of boron trifluoride dibutyl etherate. The polymer product recovered melts sharply at 177° C. When tested for thermal stability by thermogravimetric analysis, this homopolymer exhibits a reaction rate constant for thermal degradation of 245° C. of 12 weight percent per minute during the first 7 minutes of the test period. The remaining polymer (about 20 percent, by weight of the initial sample) therafter degrades at a rate of 2.5 weight percent per minute, the polymer decomposing completely and disappearing about 15 minutes after the test has started. The homopolymer thus shows significantly poorer stability than the copolymer products of the previous examples which exhibit a reaction rate constant for thermal degradation at 245° C. of less than 0.5 weight percent per minute. When the homopolymer is molded under conditions as outlined previously, badly distorted dull pieces of opaque material are obtained. These pieces are brittle and appear somewhat porous in nature, as if partially foamed by gaseous formaldehyde monomer evolved by decomposition of the homopolymer during heating.

It is to be understood that although the invention has been described with specific reference to particular embodiments thereof, it is not to be so limited, since changes and alterations therein may be made which are within the full intended scope of this invention as defined by the appended claims.

What is claimed is:

1. A process for preparing a copolymer composition having a high degree of thermal stability which comprises reacting under substantially anhydrous conditions, at a temperature ranging from 40° to 80° C. and for a time period of from 1 hour to 30 hours, a major amount of trioxane and a minor amount of glycidaldehyde in the presence of between 0.005 to about 0.6 millimol per mol of trioxane, of a polymerization catalyst selected from the group consisting of Lewis acids and coordinate complexes of metal halides with organic compounds in which the donor atom is selected from the group consisting of oxygen, nitrogen and sulfur; and recovering a solid copolymer containing from about 95 up to 99.9 percent of recurring oxymethylene units and from about 0.1 up to about 5 percent of recurring units derived from glycidaldehyde, the said copolymer composition having a reaction rate constant for thermal degradation at 245° C. of no more than 0.5 weight percent per minute.

2. The process of claim 1 in which the reaction is conducted at a temperature ranging from 50° to 60° C. for a time period of 4 to 8 hours.

3. The process of claim 1 in which the catalyst is a coordinate complex of boron trifluoride with an organic compound in which oxygen is the donor atom.

4. The process of claim 1 in which the catalyst is employed in an amount ranging between 0.01 to 0.3 millimol per mol of trioxane.

5. The process of claim 1 which is conducted in an inert, substantially anhydrous organic liquid reaction medium.

6. The process of claim 5 in which the organic liquid reaction medium is an aliphatic hydrocarbon.

References Cited

UNITED STATES PATENTS 3,067,174　12/1962　Sullivan _____ 260—67
3,067,175　12/1962　Sullivan _____ 260—67

OTHER REFERENCES

Kern et al., Angewandte Chemie 73 (6), pp. 177–186, March 21, 1961, pp. 177–183 relied on.

Furukawa et al., Pure and Applied Chemistry, 4, (2–4), pp. 387, 406, 1962, pp. 401–403 relied on.

Derwent, Belgian Patent Report, N.D. No. 26, p. 1:3, September 11, 1964.

WILLIAM H. SHORT, *Primary Examiner.*

L. M. PHYNES, *Assistant Examiner.*